Nov. 24, 1959 A. J. LACROIX, JR 2,914,157
LIQUID COOLED HYDRAULICALLY ACTUATED CLUTCH
Filed Dec. 4, 1956 3 Sheets-Sheet 1
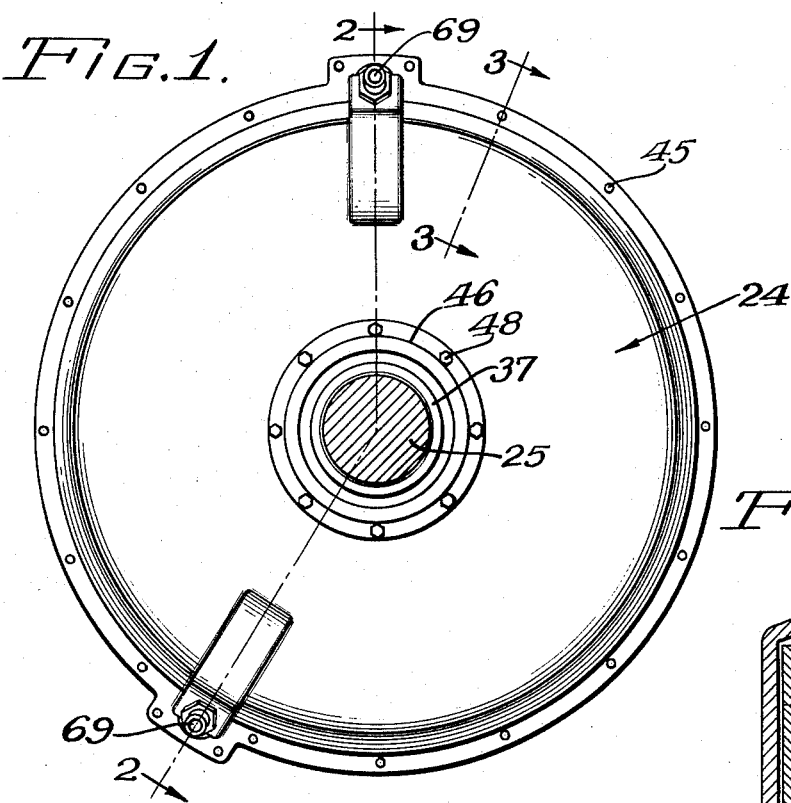
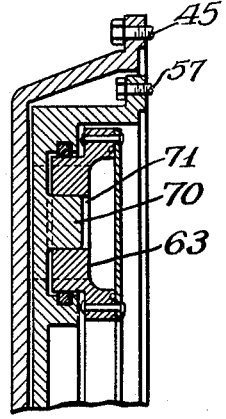
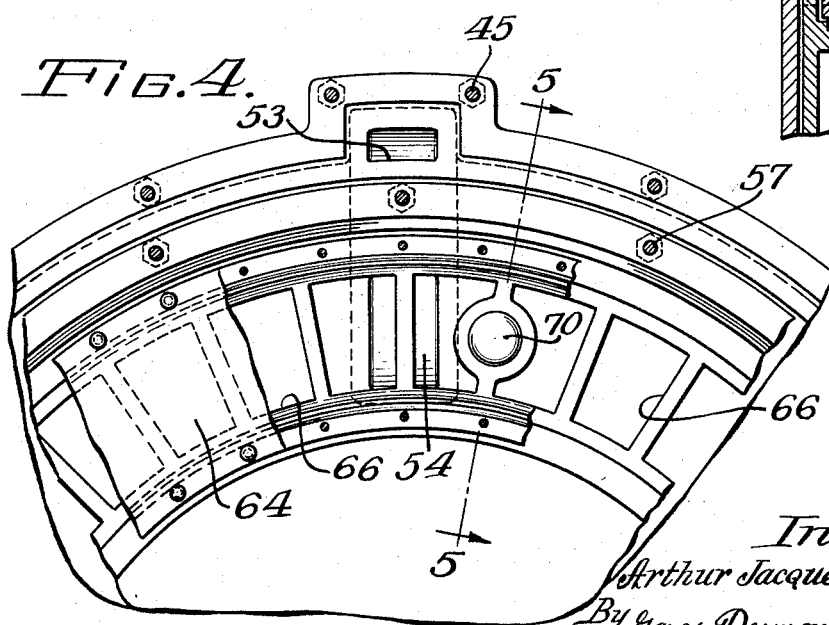
Inventor:
Arthur Jacques Lacroix, Jr.
By Gary, Desmond & Parker
Attys.

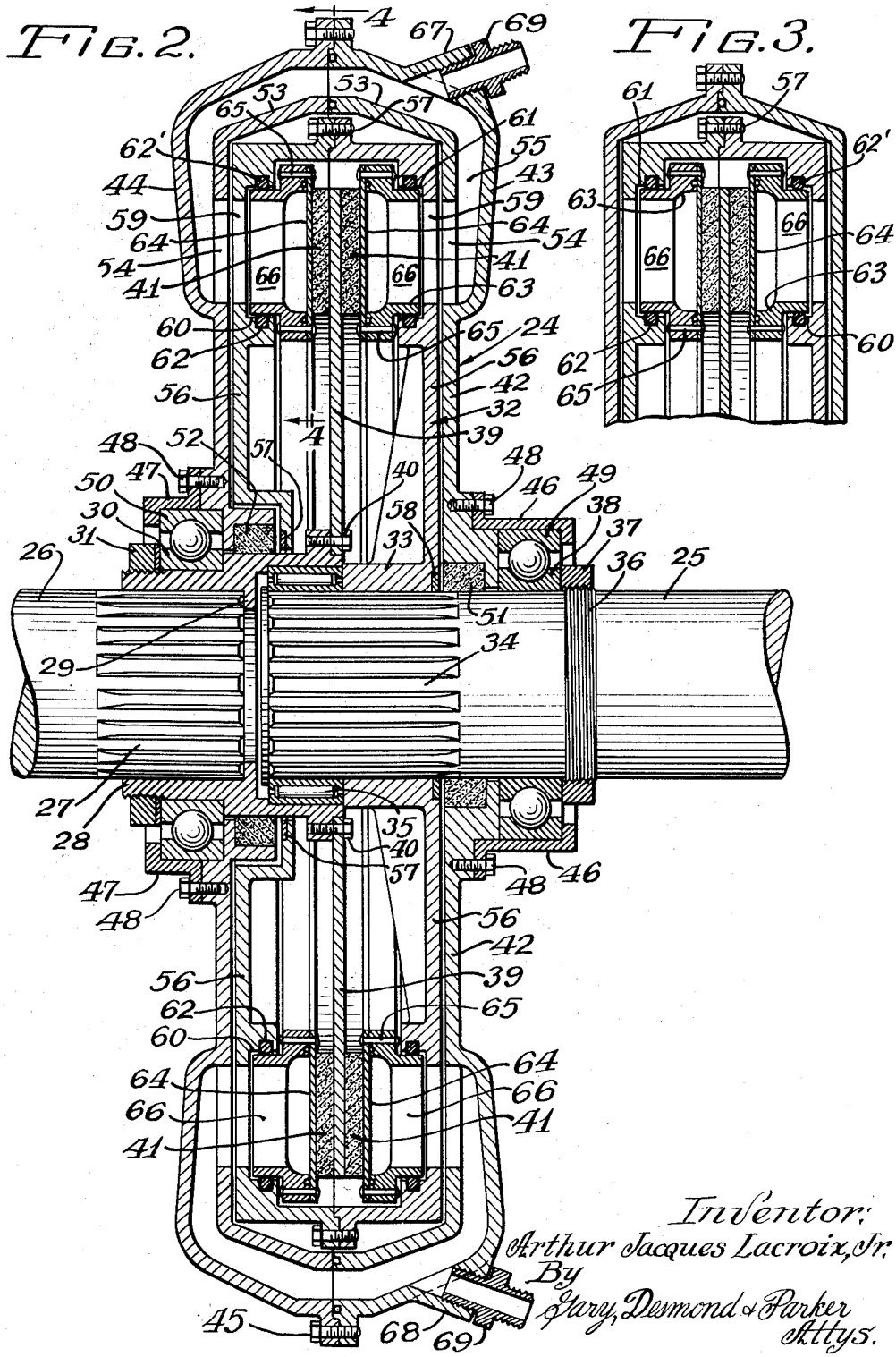

Nov. 24, 1959     A. J. LACROIX, JR     2,914,157
LIQUID COOLED HYDRAULICALLY ACTUATED CLUTCH
Filed Dec. 4, 1956     3 Sheets-Sheet 3
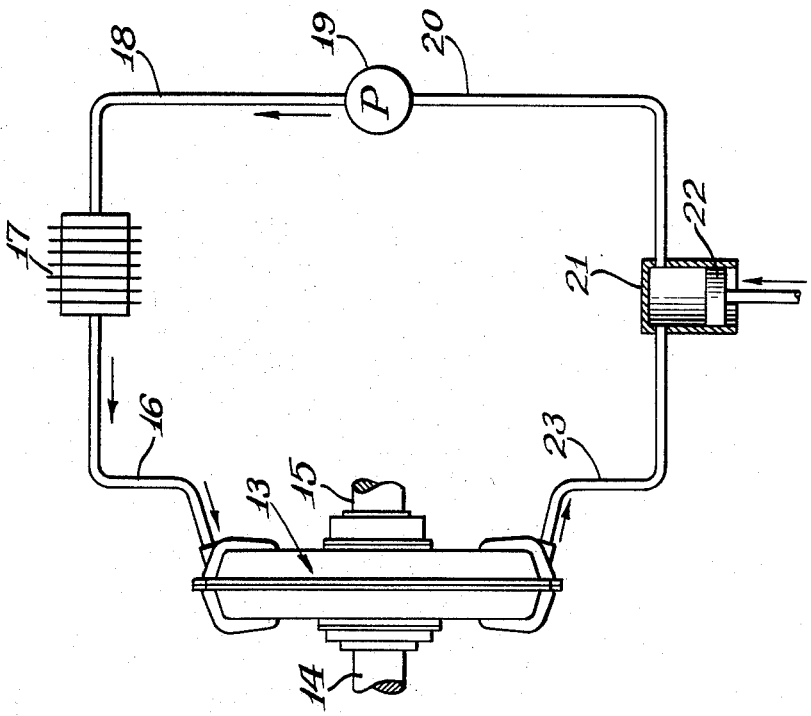
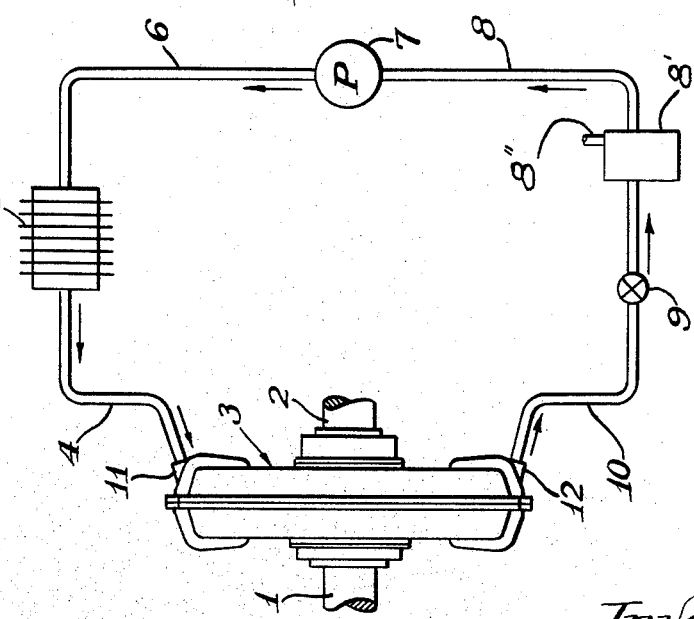
Inventor:
Arthur Jacques Lacroix, Jr.
By Gary, Desmond & Parker
Attys.

United States Patent Office 2,914,157
Patented Nov. 24, 1959

2,914,157
LIQUID COOLED HYDRAULICALLY ACTUATED CLUTCH

Arthur Jacques Lacroix, Jr., Stratford, Conn., assignor to Raybestos-Manhattan, Inc., Passaic, N.J., a corporation of New Jersey Application December 4, 1956, Serial No. 626,205

4 Claims. (Cl. 192—85)

This invention relates to improvements in liquid cooled hydraulically actuated clutches and refers particularly to a liquid cooled hydraulically actuated clutch so constructed that the effect of centrifugal force upon the hydraulic liquid is substantially eliminated.

In hydraulically actuated liquid cooled clutches the clutching pressure between the driving clutch member and the driven clutch member is dependent upon the pressure applied to the liquid in the clutch, as a matter of fact, the actual initial engagement of the clutch members is dependent upon the change in pressure of the actuating liquid.

Further, the engaging surfaces of the driving and driven clutch members are radially spaced from the axis of rotation of the members. It is at this situs that engagement takes place and heat is generated. Therefore, to cool the engaging members liquid must be circulated in a zone radially spaced from the axis of rotation.

Hence, if the same liquid is employed to actuate the clutch and cool the clutch, the cooling liquid, being radially spaced from the axis of rotation, is normally subject to a centrifugal pressure due to the rotation of the clutch members. Accordingly, it can be appreciated that this centrifugal pressure, due to the speed of rotation of the clutch members, is superimposed upon the pressure intended to control the engagement of the clutch. Hence, the engagement of such a clutch is practically uncontrollable unless the effect of centrifugal force upon the liquid is eliminated or so reduced as to have its effect negligible in affecting engagement of the clutch members.

The present invention contemplates means, in a clutch of the class described, for substantially eliminating the effect of centrifugal force upon the liquid pressure in a rotating clutch, the liquid being so introduced and removed from the clutch and being so associated with the clutch members as to have the effect of centrifugal force thereon substantially neutralized.

Other objects and advantages of the present invention will be apparent from the accompanying drawings and following detailed description.

In the drawings,

Fig. 1 is a face view of the improved clutch as viewed from the outside.

Fig. 2 is an enlarged sectional view taken on line 2—2 of Fig. 1.

Fig. 3 is an enlarged fragmentary sectional view taken on line 3—3 of Fig. 1.

Fig. 4 is a detailed sectional view taken on line 4—4 of Fig. 2.

Fig. 5 is a detailed sectional view taken on line 5—5 of Fig. 4.

Fig. 6 is a diagrammatic view illustrating the clutch in a suitable hydraulic actuating circuit.

Fig. 7 is a similar view showing the clutch in a different hydraulic actuating circuit.

Referring in detail to the drawing and with specific reference to Figs. 6 and 7, 1 indicates a driven shaft of a power transmission system and 2 indicates the driving shaft thereof. The reference numeral 3 indicates generally a clutch of the liquid cooled hydraulically actuated type which controllably connects the driving and driven shafts. The clutch 3 is connected in an hydraulic circuit comprising pipe 4, a heat exchanger 5, pipe 6, pump 7, pipe 8, expansion chamber 8', having a vent 8" to atmosphere, throttle valve 9 and pipe 10. Pipe 4 is connected to an inlet 11 and pipe 10 is connected to an outlet 12 of the clutch housing 3, the inlet and outlet being carried at the periphery of the clutch and circumferentially spaced from each other.

In the hydraulic actuating circuit illustrated in Fig. 6 the pump 7 performs the dual purpose of establishing the clutch actuating pressure in the clutch 3 and also to circulate liquid through the clutch and through the external circuit. To actuate the clutch the throttle valve 9 is manipulated. When the valve 9 is moved toward closed position the pressure of the liquid in the clutch increases and the clutch is thus actuated. When the throttle valve is completely open, the engaging members in the clutch separate and shafts 1 and 2 are disengaged. Hence, pump 7 is of sufficient capacity to establish pressure on the liquid in the clutch sufficient to cause engagement. Of course, the liquid which is circulated through the clutch is also circulated through the heat exchanger 5 and is thus cooled after it has absorbed heat from the engaging members of the clutch.

Referring particularly to Fig. 7, the present invention may be utilized with a slightly modified hydraulic circuit. In this circuit a clutch 13 is adapted to control the engagement of a driven shaft 14 and a driving shaft 15. The clutch housing is connected by means of pipe 16 to heat exchanger 17 which, in turn, is connected by pipe 18 to a pump 19. The pump 19 is connected by pipe 20 to a pressure cylinder 21 having a piston 22 operable therein, the opposite side of the cylinder being connected by pipe 23 to the clutch housing.

In this form of hydraulic actuating circuit, the pump 19 merely performs the function of circulating the liquid through the hydraulic circuit including the clutch and is only of such capacity as to overcome the frictional resistance of the hydraulic circuit. To actuate the clutch, the piston 22 is moved in the cylinder 21 and thus superimposes upon the liquid in the hydraulic circuit a substantially static pressure. When the piston 22 is moved inwardly with respect to the cylinder, the liquid pressure in the entire system is increased and the clutch is actuated. When the piston is retracted from the cylinder, the pressure of the liquid decreases and the clutch disengages.

The present invention may be employed with either type of hydraulic actuating system shown in Fig. 6 or 7.

The clutches 3 and 13, hereinbefore described, are identical and illustrated in detail in Figs. 1 to 5 inclusive wherein the clutch is generally designated at 24. The clutch 24 serves to controllably connect driving shaft 25 to a driven shaft 26. The driven shaft 26 carries splines 27 and a hub 28 is engaged with said splines, the hub carrying an inwardly extending annular flange which overhangs the inner end of shaft 26. An inner race 30 of a ball bearing assembly is carried upon hub 28 and is locked in place thereon by locking ring 31 which threadedly engages the outer surface of the hub.

A piston carrier 32 is mounted upon a hub 33 which engages splines 34 carried upon the inner end portion of shaft 25 whereby the piston carrier rotates with the driving shaft 25. A ball bearing assembly 35 is interposed between hub 28 and hub 33 whereby relative rotation between said hubs freely takes place. Shaft 25 carries threads 36 which are engaged by a locking ring 37 to hold a lower race 38 in position upon shaft 25.

A driven clutch disc 39 is rigidly mounted upon hub 28, being secured thereto by means of screws 40. Adjacent the periphery of the driven disc 39 annular or ring clutch facings 41 are mounted upon each face of the disc. An annular housing 42 embraces both the driven disc 39 and the piston carrier 32 but said housing is stationary and does not rotate with any of the clutch members. The housing 42 comprises two annular half portions 43 and 44 which are joined together at their annular outer periphery by a plurality of screws 45.

The hub portion of the housing 42 carries flanged rings 46 and 47 which are respectively secured to the half-portions 43 and 44 by screws 48. The flanged ring 46 embraces an outer race 49 of the bearing assembly comprising the inner race 38 and the ring 47 embraces outer race 50 of the bearing assembly which comprises the inner race 30. Packing rings 51 and 52 function to seal the housing in its enveloping position with respect to the rotatable clutch members, the arrangement being such that the hubs 28 and 33 may freely rotate within the housing 42 while the housing remains stationary.

Each half 43 and 44 of the housing 42 carries an annular web portion 53 which, acting together when the halves are assembled, embraces the radially outer portions of the driven disc 39 and the piston carrier 32. Each of the webs 53 is provided with a plurality of circumferentially spaced apertures 54 which provide communication between the interior space 55 of the housing and the interior of the space defined by webs 53.

The piston carrier 32 comprises two portions having spaced annular walls 56 which are joined and secured together at the outer peripheries by screws 57, the outer radial portions of said annular walls being adjacent and in plane-parallel relationship to webs 53. At their inner radial peripheries the walls are sealed by sealing rings 57 and 58 upon hub 28 and shaft 25, respectively. The annular walls 56 adjacent the webs 53 are provided with a plurality of apertures 59 which, during rotation of the piston-carrier 32, communicate with apertures 54.

Each half portion 56 of the piston-carrier 32, adjacent each group of apertures 59, carries radially spaced annular shoulders 60 and 61, being the inner and outer annular shoulders, respectively. Each annular shoulder is provided with an annular recess 62 in each of which is positioned a conventional O-ring 62', constructed of resilient material, such as, rubber or the like. Movably positioned laterally with respect to each wall 56 and registering with the shoulders 60 and 61 is a substantially ring-like piston member 63, each of which carries a pressure plate 64, secured to the respective piston members 63 by means of rivets 65 or the like. The plates 64, in operation are adapted to frictionally engage the clutch facings 41 when the clutch is engaged, as will be hereinafter more fully described.

Each of the ring-like piston members 63 is provided with a plurality of apertures 66 which communicate with the apertures 59 provided in the piston-carrier 32.

The housing half 43 carries a fluid inlet 67 and a circumferentially spaced fluid outlet 68 each of which being internally threaded to receive nipples 69 whereby they may be respectively connected to pipes 4 and 10, or 16 and 23 of the hydraulic actuating circuits shown in Figs. 6 and 7, respectively.

As shown best in Figs. 4 and 5, each wall 56 of piston-carrier 32 carries a boss 70 which is adapted to extend into an aperture 71 provided in each companion piston member 63. By this provision both the piston-carriers and companion pistons rotate as units. Although, but one boss 70 and companion aperture 71 is shown, as many circumferentially spaced bosses and apertures as desired may be employed.

In operation, liquid from the hydraulic actuating system is adapted to flow into the compartment 55 through inlet 67. Inasmuch as compartment 55 is in communication with the interior of the piston member 63 through apertures 54, 59 and 66, the liquid from said compartment also enters the piston members 63. In like fashion the liquid flows from said piston members and into compartment 55 and discharges through the outlet 68. The circulation of the liquid, as described is brought about by the operation of pumps 7 or 19.

When the clutch is disengaged, clutch plates 64 are spaced from the clutch facings 41 since the liquid pressure in compartment 55 at this phase of operation is not sufficient to displace the pistons inwardly toward the clutch facings.

When it is desired to cause engagement of the clutch, employing the hydraulic circuit shown in Fig. 6, the throttle valve 9 may be manipulated to restrict the liquid flow therethrough. By thus restricting the flow the pressure of the liquid in the clutch increases, pump 7 being of sufficient capacity to maintain adequate flow through the system even though valve 9 may be restricted. Hence, with the increase in pressure in compartment 55, the pressure on the piston members 63 increase and each piston member is displaced inwardly into frictional contact with the respective clutch facing 41. The engagement of the friction members is accompanied by slippage between said members and more or less heat is generated depending upon the load being transmitted. Since the pressure plates 64 are in contact with the flowing liquid a proportion of said heat is carried away by the liquid which eventually passes through the heat exchanger 5 and is cooled.

When it is desired to disengage the clutch, valve 9 is completely opened and, hence, the liquid pressure in the clutch decreases. The O-rings 62' are of such character that they resiliently resist movement from a normal position. Hence, when the piston member 63 moves to engaged position a torsional stress is built up in the O-rings which, when the liquid pressure decreases, returns the piston members to normal disengaged position. Of course, the return of the piston members to normal disengaged position may be accomplished in other ways, and per se, the specific use of the O-rings is not vital to the present invention.

The operation of the clutch with the hydraulic actuating system shown in Fig. 7 is quite similar to that hereinbefore described, except that application of the clutch is brought about by depression of the piston 22 in cylinder 21. Thus, a substantially static liquid pressure is superimposed on the pressure exerted by pump 19 which need be of a capacity only to overcome the frictional resistance of the circuit but not to actuate the clutch. To release the clutch, the pressure on piston 22 is relieved and, hence, normal pressure exists in compartment 55, that is, insufficient pressure to displace the piston members into engagement. The pistons are thereby permitted to disengage from the clutch facings.

A consideration of the centrifugal force involved in a rotating body of liquid will illustrate how the construction contemplated in the present invention reduces centrifugal force to a substantially negligible value.

In a rotating body of liquid, centrifugal pressure is given by the following equation:

$$P = \frac{d}{2g} W^2 (r_2^2 - r_1^2)$$

where

P = unit pressure at a predetermined point in the rotating body.
d = density of the liquid.
g = acceleration of gravity.
$r_2$ = radius from the axis of rotation to the point at which pressure is measured.
$r_1$ = inner radius of body of liquid measured from axis of rotation.
W = rotational velocity.

It will be seen from the above that the centrifugal pressure increases with increasing radius, but that as the inner radius $r_1$ of the rotating liquid approaches $r_2$, the centrifugal pressure decreases as the difference of the squares of the respective radii.

Considering the construction of the present invention, when the actuating pressure is released and with the driving member in rotation, the pressure at the inlet 67 and the outlet 68 will be approximately atmospheric. This pressure is the maximum centrifugal pressure existing in the clutch since $r_2$, in the equation hereinbefore set forth, is a maximum at the inlet and outlet since they are removed the greatest distance from the axis of rotation. As progression is made radially inwardly in the liquid zone, the pressure will progressively drop below the pressure at $r_2$ until at some point it will equal the vapor pressure of the liquid at its existing temperature. Radially inwardly from this point only vapor will exist.

Inasmuch as engagement of the members 64 and 41 is dependent upon the difference of pressure between the zone in which the driven member acts (atmospheric pressure) and the pressure in zone 66, which is at most atmospheric pressure and may be below atmospheric pressure, substantially no centrifugal pressure exists which will cause unintended engagement of the clutch and in some instances, a condition may exist where the pressure differential may be such as to assist in disengagement of the clutch.

It is to be understood, of course, that in so far as the present invention is concerned it is immaterial as to the specific manner in which the liquid is cooled in its external cycle nor where the heat exchangers 5 or 17 may be placed relative to the other elements contained in the external circuit. In addition, in the specification and drawings the liquid cooled and hydraulically actuated element is described and shown as the driving element and the clutch facing carrying member is described and shown as the driven element. It is to be understood that these elements may be reversed as to their function, that is, the liquid cooled hydraulically actuated element may be the driven element and the clutch facing carrying element may be the driving element. It can readily be understood that the advantages of the invention are inherent in either case.

I claim as my invention:

1. A liquid cooled hydraulically actuated clutch comprising a stationary annular casing having a closed annular liquid compartment adjacent the outer periphery of the casing, a clutch member and a cooperating companion clutch member rotatably positioned in said casing, said clutch member comprising an annular clutch plate, a clutch facing carried by said clutch plate adjacent the outer periphery of said casing, said companion clutch member comprising an annular piston carrier enclosing said clutch plate and separating it from said compartment, said piston carrier being provided with an annular opening adjacent said clutch facing, an annular piston member laterally movable in said opening, a pressure plate carried by said piston member for frictional engagement with said clutch facing when pressure is established upon the liquid in said casing, a liquid inlet for said compartment adjacent the outer periphery of the casing, a separate liquid outlet for said liquid compartment adjacent the outer periphery thereof, and means for circulating liquid under pressure through said liquid inlet and outlet to contact one face of the pressure plate to cool the pressure plate and to move the piston member toward said clutch plate to frictionally engage the pressure plate and clutch facing.

2. A liquid cooled hydraulically actuated clutch comprising a stationary annular casing having a closed annular liquid compartment adjacent the outer periphery of the casing, a clutch member and a cooperating companion clutch member rotatably positioned in said casing, said clutch member comprising an annular clutch plate, a clutch facing carried by said clutch plate adjacent the outer periphery of said casing, said companion clutch member comprising an annular piston carrier enclosing said clutch plate, said piston carrier being provided with an annular opening adjacent said clutch facing, an annular piston member sealing said opening and laterally movable therein, a pressure plate carried by said piston member for frictional engagement with said clutch facing when pressure is established upon the liquid in said casing to laterally move said piston member, a liquid inlet for said compartment adjacent the outer periphery of the casing, a separate liquid outlet for said liquid compartment adjacent the outer periphery thereof, and means for circulating liquid under pressure through said liquid inlet and outlet to contact one face of the pressure plate to cool the pressure plate and to move the piston member toward said clutch plate to frictionally engage the pressure plate and clutch facing.

3. A liquid cooled hydraulically actuated clutch comprising a stationary annular casing having a closed annular liquid compartment adjacent the outer periphery of the casing, a clutch member and a cooperating companion clutch member positioned in said casing for independent and conjoint rotatable movement, said clutch member comprising an annular clutch plate, a clutch facing carried by said clutch plate adjacent the outer periphery of said casing, said companion clutch member comprising an annular piston carrier enclosing said clutch plate, said piston carrier being provided with an annular opening adjacent said clutch facing, an annular piston member sealing said opening and laterally movable therein, a pressure plate carried by said piston member for frictional engagement with said clutch facing when pressure is established upon the liquid in said casing to laterally move said piston member, a liquid inlet for said compartment adjacent the outer periphery of the casing, a separate liquid outlet for said liquid compartment adjacent the outer periphery thereof and circumferentially spaced from said liquid inlet, and means for circulating liquid under pressure through said liquid inlet and outlet to contact one face of the pressure plate to cool the pressure plate and to move the piston member toward said clutch plate to frictionally engage the pressure plate and clutch facing.

4. A liquid cooled hydraulically actuated clutch comprising a stationary annular casing having a closed annular liquid compartment adjacent the outer periphery of the casing, a clutch member and a cooperating companion clutch member rotatably positioned in said casing, said clutch member comprising an annular clutch plate, a clutch facing carried on each opposite face of said clutch plate adjacent the outer periphery of said casing, said companion clutch member comprising an annular piston carrier enclosing said clutch plate, said piston carrier being provided with opposite annular openings adjacent said respective clutch facings, an annular piston member laterally movable in each opening, a pressure plate carried by each piston member for frictional engagement with a respective clutch facing when pressure is established upon the liquid in said casing, a liquid inlet for said compartment adjacent the outer periphery of the casing, a separate liquid outlet for said liquid compartment adjacent the outer periphery thereof, and means for circulating liquid under pressure through said liquid inlet and outlet to contact the outer faces of the pressure plates to cool the pressure plates and to move the piston members toward said clutch plate to frictionally engage the pressure plates and clutch facings.

References Cited in the file of this patent

UNITED STATES PATENTS

| | | |
|---|---|---|
| 690,641 | Davis | Jan. 7, 1902 |
| 1,118,384 | Thomson | Nov. 24, 1914 |
| 1,137,944 | Allen | May 4, 1915 |
| 2,404,822 | Adney | July 30, 1946 |
| 2,727,611 | Folley et al. | Dec. 20, 1955 |

FOREIGN PATENTS

| | | |
|---|---|---|
| 13,106 | Great Britain | of 1912 |
| 57,645 | Sweden | Oct. 7, 1924 |
| 98,905 | Sweden | May 14, 1940 |
| 838,974 | Germany | May 15, 1952 |
| 896,915 | Germany | Nov. 16, 1953 |